(12) United States Patent
Meier et al.

(10) Patent No.: US 8,712,705 B2
(45) Date of Patent: Apr. 29, 2014

(54) FIELD DEVICE CONFIGURATION SYSTEM

(75) Inventors: Marshall Leon Meier, Waconia, MN (US); Dale Scott Davis, Prior Lake, MN (US); David Eugene Wiklund, Eden Prairie, MN (US); Andrey Leonidovich Rumyantsev, St. Petersburg (RU); Kirill Victorovich Petrov, St. Petersburg (RU)

(73) Assignee: Rosemount Inc., Eden Praie, MN (US)

( * ) Notice: Subject to any disclaimer, the term of this patent is extended or adjusted under 35 U.S.C. 154(b) by 1152 days.

(21) Appl. No.: 12/667,598

(22) PCT Filed: Mar. 31, 2009

(86) PCT No.: PCT/RU2009/000154
§ 371 (c)(1),
(2), (4) Date: Jan. 4, 2010

(87) PCT Pub. No.: WO2010/114408
PCT Pub. Date: Oct. 7, 2010

(65) Prior Publication Data
US 2011/0022979 A1    Jan. 27, 2011

(51) Int. Cl.
*G06F 19/00* (2011.01)
*G01F 1/36* (2006.01)
*G01D 1/00* (2006.01)
*G01D 15/00* (2006.01)
*G01F 1/42* (2006.01)
*G01F 15/06* (2006.01)

(52) U.S. Cl.
CPC *G01F 1/363* (2013.01); *G01D 1/00* (2013.01); *G01D 15/00* (2013.01); *G01F 1/42* (2013.01); *G01F 15/068* (2013.01)
USPC .......................................... 702/45; 700/281

(58) Field of Classification Search
CPC ............ G01D 1/00; G01D 15/00; G01F 1/42; G01F 15/068; G06F 1/363; G05B 2219/25428
USPC ........... 702/45, 50, 100, 188; 73/1.34, 31.02, 73/32 A, 242, 861, 861.22; 340/3.7, 870.3; 700/19, 197, 281; 119/14.02; 356/28
See application file for complete search history.

(56) References Cited

U.S. PATENT DOCUMENTS

| 4,249,164 A | 2/1981 | Tivy ........................... 340/870.3 |
| 4,551,719 A | 11/1985 | Carlin et al. ................... 340/3.7 |

(Continued)

FOREIGN PATENT DOCUMENTS

| JP | 2006185077 A | 7/2006 |
| JP | 2006214789 A | 8/2006 |

(Continued)

OTHER PUBLICATIONS

Second Chinese Office Action for Chinese Patent Application No. 200980158425.2, dated May 20, 2013, 9 pages.

(Continued)

*Primary Examiner* — John H Le
(74) *Attorney, Agent, or Firm* — Westman, Champlin & Koehler, P.A.

(57) ABSTRACT

A system to configure a field device of the type used to calculate a flow of a process fluid. The system includes a flow repository comprising a list of process fluids with which the field device can be used, fluid equation data which provides information related to fluid equations for calculating fluid parameters of the process fluid, a list of primary elements, and primary element equation data which provides information related to primary element equations and fluid equations for calculating flow of the process fluid. The flow application is adapted to retrieve data from the flow repository and to generate information which is used by field device to calculate the flow of the process fluid.

17 Claims, 10 Drawing Sheets

(56) References Cited

U.S. PATENT DOCUMENTS

| | | | |
|---|---|---|---|
| 4,996,871 A | 3/1991 | Romano | 73/32 A |
| 5,835,379 A | 11/1998 | Nakano | 700/197 |
| 6,068,612 A | 5/2000 | Bowman et al. | 604/122 |
| 6,092,409 A | 7/2000 | Patten et al. | 73/1.34 |
| 6,182,019 B1 | 1/2001 | Wiklund | 702/100 |
| 6,990,414 B2 | 1/2006 | Belke et al. | 702/45 |
| 7,043,374 B2 | 5/2006 | Wang et al. | 702/45 |
| 7,080,544 B2 | 7/2006 | Stepanik et al. | 73/31.02 |
| 7,197,408 B2 * | 3/2007 | Ferreira et al. | 702/45 |
| 7,228,186 B2 | 6/2007 | Karschnia et al. | 700/19 |
| 7,258,024 B2 | 8/2007 | Dimarco et al. | 73/861.22 |
| 7,299,348 B2 | 11/2007 | Stinus et al. | 713/2 |
| 7,516,023 B2 * | 4/2009 | Ferreira et al. | 702/45 |
| 8,175,754 B2 | 5/2012 | Wiklund | 700/281 |
| 2003/0115109 A1 | 6/2003 | Rogers et al. | 705/26 |
| 2004/0173091 A1 | 9/2004 | Belke et al. | 95/1 |
| 2004/0207637 A1 | 10/2004 | Pauly et al. | 345/619 |
| 2005/0171708 A1 | 8/2005 | Ferreira et al. | 702/45 |
| 2006/0201430 A1 | 9/2006 | Davis | 119/14.02 |

FOREIGN PATENT DOCUMENTS

| | | |
|---|---|---|
| WO | 2004/072621 | 8/2004 |
| WO | 2005/062003 | 7/2005 |
| WO | 2006/020870 | 2/2006 |
| WO | 2006/073388 | 7/2006 |
| WO | WO 2009/143438 | 11/2009 |

OTHER PUBLICATIONS

Official Communication from European Patent Application No. 09751666.0, dated Jan. 13, 2011.
Quick Installation Guide Rosemount 3095 MultiVariable "Rosemount 3095 MultiVariables™ Mass Flow Transmitter with Hart or Foundation Fieldbus Protocol; Rosemount 3095 Mass Flowmeter Electronics," by Rosemount Inc., Eden Prairie, Minnesota 55344, Jan. 2005, pp. 1-20.
International Search Report and Written Opinion for PCT Application No. PCT/US2009/045005, dated Aug. 20, 2009.
First Communication for European Patent Application No. 09751666.0, dated Dec. 13, 2011.
Official Action for Russian Patent Application No. 2010152523, transmitted on Feb. 22, 2012.
First Office Action for Japanese Patent Application No. 2011510727, dated Feb. 14, 2012.
First Office Action for Chinese Patent Application No. 200980118870.6, dated Feb. 13, 2012.
First Chinese Office Action for Chinese Patent Application No. 200980158425.2, issued Aug. 20, 2012, 6 pages.
Product Data Sheet 00813-0100-4738, Rev. HA, Catalog 2008-2009, entitled: "Rosemount 3095 Mutlivariable™ Transmitter with MODBUS® Protocol", 16 pgs.
User's Manual for FSA120 (EJXMVTool™) EJX-MV Configuration DTM, 4$^{th}$ Edition, Yokogawa Electric Corporation, copyright 2006, 98 pgs.
Communication pursuant to Article 94(3) EPC for European Patent Application No. 09 748 158.4-1802, dated Feb. 18, 2013, 9 pages.
Office Action for PCT Application No. PCT/RU2009000154, dated Nov. 11, 2011, 2 pgs.
First Office Action for Japanese Patent Application No. 2012-503352, dispatched date Mar. 12, 2013, 7 pages.
"Innova-Sonic® In-Line Model 206 Liquid Ultrasonic Flowmeter" *Instruction Manual* of Sierra Instruments, 2008, pp. Iii-iv and 4-37.
"Prowirl 73 Flowmeter via HART to the PlantPAx Automation System", Endress+Hauser, Jan. 2009, pp. 2-33.
"Portaflow 300 Ultrasonic Flowmeter Manual" Micronics, Mar. 2001, pp. 1-36.
"FP-93 Flow Process Operation & Maintenance Manual" Engineering Management Company, 2001, pp. 1-82.
Notification of Transmittal of the International Search Report and the Written Opinion of the International Searching Authority, PCT/RU2009/000154, dated Jan. 20, 2010.
"Model Turbo-Bar", 2005, pp. 1-16, retrieved from the Internet: URL:http://www.encoflow.com/spanish/documents/SL-TBAR-350-02.pdf>. retrieved Jan. 7, 2009.
Office Action from CN 200980158425.2, dated Nov. 26, 2013.
Third Official Action dated Aug. 16, 2013 in related Chinese application No. 200980158425.2, with English Translation. 10 pgs.

* cited by examiner

FIELD DEVICE CONFIGURATION SYSTEM

FIELD

The present invention is generally related to field device configuration systems for use with industrial process control and monitoring systems. More specifically, the present invention relates to configuring field devices of the type used to measure process variables of an industrial process fluid including multi-variable transmitters.

BACKGROUND

In industrial process automation technology, process devices (such as process variable transmitters) can be used to generate analog or digital measurement signals that represent process variables of an industrial process. Such process transmitters can be mounted to process equipment, such as conduits, tanks, valves, and other process equipment and can include sensors to produce measurement data related to process variables, such as, for example, pressure (including differential pressure), temperature, fluid levels, other process variables, or any combination thereof.

However, some process variables, such as the flow rate of a process fluid, are typically not measured directly and are calculated based upon other process variables. Using flow rate as an example, a primary element is used, such as an orifice plate, to measure flow. A differential pressure can be measured across the orifice plate and the flow rate calculated based upon the measured differential pressure. The flow rate is further a function of other attributes of the process fluid which are preferably measured or calculated in order to more accurately determine flow. One such attribute, for example, is the fluid density which may be calculated as a function of temperature and pressure of the process fluid. Thus, there are a large number of possible equations which may be used in the determination of flow rate. These equations are based upon the composition of the process fluid, the particular technique used to determine flow rate, the particular primary element used in the measurement, the desired level of accuracy, etc. When commissioning a field device in an industrial process, all of these equations and configuration information must be stored in the field device. Configuring a field device typically requires a technician with a high skill level to spend a significant amount of time entering the appropriate data. Further, it is difficult for an operator to change the configuration of a particular field device.

SUMMARY

The present invention provides a flow repository for use in configuring a field device. The flow repository contains information used in determining the flow rate of the process fluid. Such information includes, for example, a list of fluids for which a field device may be employed to measure the flow of process fluid, fluid equation data which provides information related to equations used in calculating parameters of the process fluid, a list of primary elements which may be used in the measurement of fluid flow and primary element equation data which provides information related to equations used in calculating primary element parameters used to calculate the flow of the process fluid. In one particular configuration, data from the flow repository is selected by an operator for use in configuring the field device. Data for use in implementing flow equations is loaded into a field device.

In another particular embodiment, a system to configure a field device includes a flow repository having a list of fluid types defining categories of fluids with which a field device can be used, fluid components that can be used to define a particular process fluid, a list of equation identifiers to identify equations within a flow application, and a list of primary elements. The system further includes a flow application adapted to retrieve data from the flow repository and to generate a graphical user interface (GUI) including user-selectable options related to the retrieved data. The flow application is responsive to user input to configure the field device.

DETAILED DESCRIPTION OF ILLUSTRATIVE EMBODIMENTS

Figure 1:
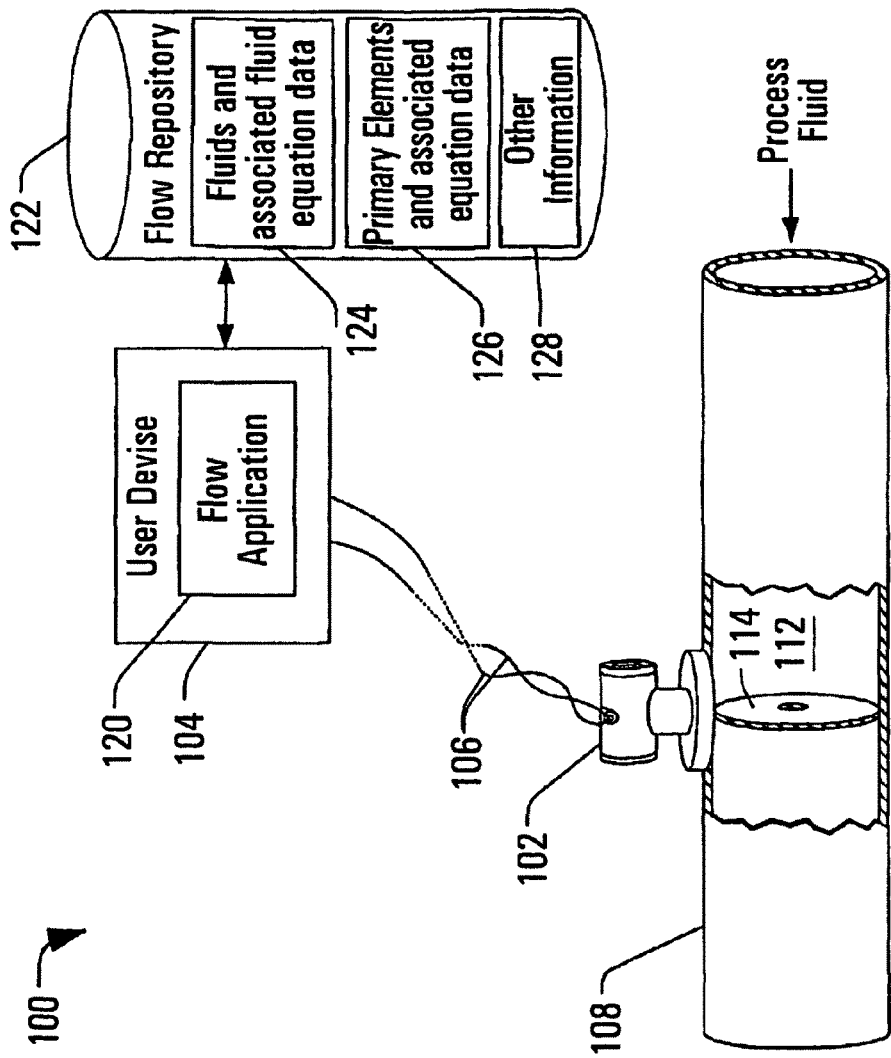
FIG. 1 is a diagram of a particular illustrative embodiment of a process control and monitoring system including a field device coupled to an industrial process and communicatively coupled to a user device having a flow application and having access to a flow repository.

Commissioning of field devices (such as multi-variable transmitters, actuators, and other field-installed sensors and transducers) can include three primary components: the user, configuration software, and the particular field device. The user is generally responsible for selecting a fluid and a primary flow element, specifying the operating conditions, and providing any and all of the required dimensional information for the primary element. The configuration software displays fluid and primary element options available to the user, collects the relevant information for the application, and calculates coefficients for the flow algorithm, which coefficients can be sent to the multi-variable transmitter for use in calculating process parameters using a generic algorithm.

A particular advantage of using a generic flow calculating algorithm is that the transmitter does not need to know what type of fluid or primary element is involved in the flow calculation. Rather, a flow repository can store data that can be used by the flow application to calculate fluid flow information. In particular, the flow repository can include a list of fluids and lists of primary elements that can be used to monitor flow of such fluids. Further, the flow repository can include information related to a particular equation for use in calculating flow information for each particular fluid and primary element. In a particular embodiment, the flow repository can further include custom equations that can be associated with a particular primary element or fluid and interpreted by the flow application to calculate flow information associated with the primary element or fluid.

With the present invention, a flow repository is separate from the flow application. This allows the specifics of how the particular flow application is used to configure a particular field device to be customized or altered simply by updating the flow repository without recompiling the flow application. Thus, a particular flow application can be used across many different field devices, many different process fluids, and primary elements simply by providing the appropriate data in the flow repository.

Various techniques can be used to calculate the mass flow ($Q_m$) of a process fluid. In the following equations, the following definitions are used:

TABLE 1

| | |
|---|---|
| $Q_m =$ | Mass flow rate ($lb_m$/unit time, SCF/unit time) |
| $Q_v =$ | Volumetric flow rate (Gal/unit time, ACF/unit time) |
| $Q_E =$ | Energy flow rate (Btu/unit time, MJ/unit time) |
| $N =$ | Units conversion factor |
| $C_d =$ | Primary element discharge coefficient (dimensionless) |
| $Y_1 =$ | Primary element gas expansion factor (dimensionless) |
| $D =$ | Pipe diameter (inches) |
| $d =$ | Primary element throat diameter (inches) |
| $\rho =$ | Fluid density ($lb_m/ft^3$) |
| $H =$ | Enthalpy (Btu/lbm) or Heating Value (Btu/lbm) |

One simplified method to calculate fluid flow uses the following equation:

$$Q_m \approx K_s \times \sqrt{DP} \qquad \text{EQ. 1}$$

Equation 1 can be used when the only process variable which is available is the differential pressure (DP). Equation 1 assumes that a constant $K_s$ is calculated under a nominal set of conditions (such as nominal pressure, differential pressure, temperature). In some instances, Equation 1 may be accurate for a range of particular values of the process variable DP. However, Equation 1 ignores any changes in fluid density due to changes in pressure and temperature. Equation 1 also ignores any variations in the terms which are related to the primary element which include the primary element discharge coefficient $C_d$, changes in the primary element throat diameter, the pipe diameter as a function of temperature and the primary element gas expansion factor $Y_1$.

A more accurate calculation of mass flow can be determined using a partially compensated flow equation such as:

$$Q_m \approx K_p \times \sqrt{P/T} \times \sqrt{DP} \qquad \text{EQ. 2}$$

where $K_p$ is a constant, P is absolute pressure, T is temperature and DP is differential pressure.

Equation 2 can be implemented when pressure temperature and differential pressure are available in the field device. However, Equation 2 uses an ideal gas approximation of the fluid density and therefore does not account for all of the changes in the gas density due to pressure and temperature variations. Further, Equation 2 assumes that $K_P$ is calculated at a set of nominal conditions and ignores variations in the terms of the Equations which are related to the primary element.

A fully compensated flow equation can be implemented as follows:

$$Q_m = N \times C_d \times Y_1 \times \frac{d^2}{\sqrt{1-(d/D)}} \times \sqrt{\rho} \times \sqrt{DP} \qquad \text{EQ. 3}$$

$$Q_E = Q_m \times H \qquad \text{EQ 4}$$

In Equations 3 and 4, all the terms can be implemented in real time if temperature, pressure and differential pressure of the process fluid are available.

As illustrated above, a number of fluid properties are used in the calculation of the flow rate. These include the fluid density, the fluid viscosity ($\mu$), the Joule-Thomson coefficient ($\mu_{JT}$), the isentropic exponent ($\kappa$) and the enthalpy or heating value (H). Fluid-specific equations are required to calculate these properties. Information related to the calculation of these properties is contained in the flow repository data base discussed above. Primary element parameters used in the calculation of the flow rate include, for example, the primary element discharge coefficient ($C_d$), the primary element gas expansion factor ($Y_1$), the primary element throat diameter (d) and the pipe diameter (D) and the effects of thermal expansion on the throat and pipe diameters. Primary-element specific equations are required to calculate these parameters. Information related to the calculation of the primary element parameters is contained in the flow repository data base discussed above. The present invention provides fluid equation data and primary element data in a portable database which is highly configurable and allows a single piece of software to be used across a wide variety of fluids and primary elements.

In operating with the flow repository, the flow application receives information from the operator which indicates whether the fluid is a liquid or a gas, what the particular liquid or gas is, if the fluid is a steam and if it is superheated or saturated, if the fluid is a natural gas and if so what is the composition of the natural gas, etc. Further, the application collects information regarding the primary element. Specifically, what type of primary element is being used, the diameter of the primary element as well as the diameter of the pipe through which the fluid is flowing. Examples of primary elements include orifice plates, nozzles, Venturis, multiport averaging Pitot devices, cone-type devices, wedge devices, or others. Finally, the software should determine the nominal operating pressure and temperature as well as collect information for the process operating ranges. This is because the terms in the above equations (such as Equations 3 and 4), are typically not directly implemented in the field device due to memory and processing speed constraints. Instead, polynomial functions are used to approximate these terms over the nominal operating range. As discussed below, the above information can be collected through a graphical user interface (GUI) from an operator. If sufficient memory and processing speed are present in the field device there is nothing to preclude the use of the flow repository.

In a particular embodiment, a flow application is disclosed for use in configuring a particular field device (such as a multi-variable transmitter). Upon initiation of the flow application, the flow application accesses a flow repository to review field device configuration information, including a list of fluids with associated equation identification information, and other data. The flow application dynamically assembles a graphical user interface (GUI) based on the information retrieved from the flow repository to allow a user to select particular options to configure a field device and its associated flow equations. Further, in a particular example, the user interface can be customized by altering the flow repository to add customized options or to remove undesired options. In another particular embodiment, the flow repository may also allow for user-based or process-based customization to provide a customized interface, which may reduce configuration errors by limiting configuration options for particular users.

FIG. 1 is a diagram of a particular illustrative embodiment of a process control and monitoring system 100 including a field device 102 coupled to an industrial process and communicatively coupled to a (user device 104 such as a portable computer or the like) having a flow application 120 and access to a flow repository 122. The flow repository 122 can be located in any appropriate location including located in the user device 104. The user device 104 can include a processor and/or processing logic that is adapted to execute the flow application 120. The user device 104 is adapted to communicate with the field device 102 via a communications link 106, which may be a wired communications link or a wireless communications link, depending on the particular implementation.

In this particular embodiment, the field device 102 can be a process control transmitter device that is adapted to monitor process variable parameters, such as fluid static pressure, differential pressure, temperature, other process variable parameters, or any combination thereof. In this particular example, the field device 102 is coupled to a pipe 108 that carries a process fluid 112, such as a liquid or a gas. Further, in this particular instance, the field device 102 includes a differential pressure generation element 114, such as an orifice plate. In this particular example, the field device 102 is adapted to calculate flow rate and other process parameters by measuring a fluid pressure on either side of the differential pressure generation element 114 along with absolute or gauge pressure and temperature.

In a particular embodiment, a user can access the flow application 120 via the user device 104. Upon execution, the flow application 120 is adapted to retrieve, from the flow repository 122, a list of fluids, a list of primary elements, and equation information associated with each primary element and fluid, other data, or any combination thereof. The equation information can be in the form of an actual representation of the equations, pointers to equations stored in other locations such as on the flow application, combinations thereof or other information which is used to relate fluid or primary element equations with the user entered data. In a particular example, the flow repository 122 can include multiple entries associated with a particular primary element that identify different discharge coefficient or gas expansion factor equations. Further, in a particular embodiment, the flow repository 122 can include custom equation information that can be executed by the flow application 120 to perform a custom flow calculation. In yet another particular embodiment, a custom flow application can be compiled to a dynamic link library (DLL) that can be identified by an entry within the flow repository 122 and accessed by the flow application 120 to perform the custom flow calculation.

The flow repository 122 can include data related to a list of fluids/types of fluids 124. The list of fluids/types of fluids 124 can include a hierarchical list. In a particular example, the list of fluids/types of fluids 124 can include top level fluid categories, such as GAS, LIQUID and STEAM. Within each category, the list of fluids/types of fluids 124 can include different types of fluids. For example, the GAS category can include subcategories, such as natural gas, database gas, and custom gas. Each subcategory can include further subcategories, which may identify a particular category of process fluid flow calculation. For example, under the natural gas subcategory, the list of fluid/types of fluids 124 can include "AGA Report No. 8 Detail Characterization Method", "AGA Report No. 8 Gross Characterization Method 1", and "AGA Report No. 8 Gross Characterization Method 2", other characterization, composition, or physical property methods, or any combination thereof.

The flow repository 122 can also include lists of primary elements and their associated equation data or information (such as identifiers) 126. In a particular embodiment, the flow application 122 can include multiple equations, which may be identified for use based on the associated flow equation identifiers from the flow repository. In a particular example, a primary element may be listed multiple times, where each listing has an associated equation identifier. A graphical user interface produced by the flow application 120 allows a user to select a particular primary element and its associated equation from a list.

The flow repository 122 can also include other information 128, which may include, for example, custom equation information, user settings, other customization features, or any combination thereof.

In a particular embodiment, the flow application 120 is adapted to access the flow repository 122 during initialization of the flow application 120 to retrieve the list of fluids 124, a list of primary elements and associated fluid and primary element equation data 126, and the other information 128. The flow application 120 is adapted to use the retrieved information to generate a graphical user interface (GUI) that includes one or more user-selectable indicators (such as cheek boxes, radio buttons, form buttons, pull-down or pop-up menus, text fields, combination boxes, other objects, or any combination thereof) that correspond to user selectable options and associated parameters for configuring a particular field device, such as the field device 102. In a particular example, the GUI can include multiple selectable tabs to assist a user in selecting a fluid/category from a displayed list that is related to the list of fluids 124 retrieved from the flow repository 122. Once a selection is received at the GUI, the GUI is adapted to display related options and to assist a user in selecting and configuring a primary element, such as a primary element selected from the list of primary elements and associated equation data 126 retrieved from the flow repository 122. The GUI may include information derived from user selections, information retrieved from the flow repository 122, calculated information based on the equation identified by the associated equation data, or any combination thereof. The user may access flow application 120 user interface to configure the field device 102 by interacting with the one or more user-selectable indicators provided within the GUI. In a particular example, the user can select between multiple primary element options, each of which corresponds to a particular type of primary element and particular associated primary element equation data. Further, the user can specify particular dimensions associated with the selected primary element and configure other related settings, such as the fluid composition, and other options. In a particular embodiment, the flow application 120 is configured to transmit configuration data to the field device 102 via the communications link 106 (which, as mentioned above, can be a wireless link) to update application information at the field device 102.

In a particular embodiment, the flow application 120 can include multiple equations for calculating fluid properties. Each equation may be used with one or more of primary elements identified within the flow repository. By identifying a particular fluid property equation based on the data for that particular fluid and the selected primary element, the flow application 120 determines which equation to apply based on the user's selection along with the current constants for the primary element. Many primary elements are governed by various national and international standards. Providing backward compatible support for these standards can result in a bewildering array of options. For example, to support all options for an ISO 5167 corner tap orifice meter requires there to be three entries in the user interface. The difference between these entries involves the discharge coefficient equation, the gas expansion factor equation, or both. When flange tap and D or D/2 pressure tap orientations for the ISO standard as well as the ASME and AGA standards are employed, there can be more than a dozen options for orifice meters from which the user must choose. However, the flow application 120 can provide a user interface that includes a selectable list of primary elements for selection by a user and can provide selections associated with the selected primary element so that the primary element is configured correctly without requiring that the user has specific knowledge of all of the differences between the various equations, the various primary elements, the various configuration options, or any combination thereof. Thus, the flow application 120 provides a configuration interface that is specific to the field device 102 and that includes configurable options that are specific to the associated application or user needs.

Further, for a given fluid, especially gases, there are a number of equations of state that can be used. Each such equation can produce slightly different density or compressibility factor values. For example, for a gas such as nitrogen, there are at least seven different equations of state that can be used. The flow application 120 can remove some possible confusion related to such applications by reducing the number of options provided to the user based upon the input data, or based upon the information contained in the flow repository. In a particular embodiment, the flow repository 122 makes it possible to support selection between alternative equations 128 for the calculation of fluid properties. By separating the flow repository 122 from the flow application 120, the flow application 120 can be customized or altered by updating the flow repository 122 without recompiling the flow application 120.

In a particular example, the flow repository 122 can be an extensible markup language (XML) file that is organized hierarchically by the flow application 120 to retrieve device information for inclusion within the GUI. In another example, the flow repository 122 can be included in a structured query language (SQL) data file, a text file with tags, another type of file, or any combination thereof.

In a particular embodiment, if a user desires to utilize the American Gas Association (AGA-3) equation for the discharge coefficients of a particular device, a specific equation is used for the gas expansion factor calculation. The latest revisions of the ISO standard and ASME standards specify a different expansion factor equation. The use of the flow repository 122 allows the user to identify multiple selectable listings for a particular primary element. Each listing for the particular primary element may be associated with different equation data, allowing the user to select the primary element and to choose the particular listing that corresponds to the more accurate expansion factor equation without having to rebuild the entire software package. This allows the software system to be highly configurable without requiring changes in the underlying software.

For example, the flow application 120 can be updated by replacing the flow repository 122 with a new version without having to recompile or reinstall the flow application 120. In a particular example, a web page may be provided whereby a user can request changes or additions to the flow repository, and the manufacturer can provide a new version of the flow repository 122 to the user for installation. The user can then copy the revised version to the appropriate directory, either on a computer or a network, and restart the flow application to begin using the updated version. In a particular embodiment, an editing tool may be provided to assist a user in editing the flow repository 122 to create custom entries.

A particular advantage is realized in that, by separating the flow repository 122 from the flow application 120, internal testing of the flow application 120 is simplified. In particular, a test version of the flow repository 122 can be formed that isolates specific items (specific equations and/or field device settings) for testing of any changes to the flow repository without having to re-test the compiled flow application 120, thereby reducing complexity of the testing process.

Figure 2:
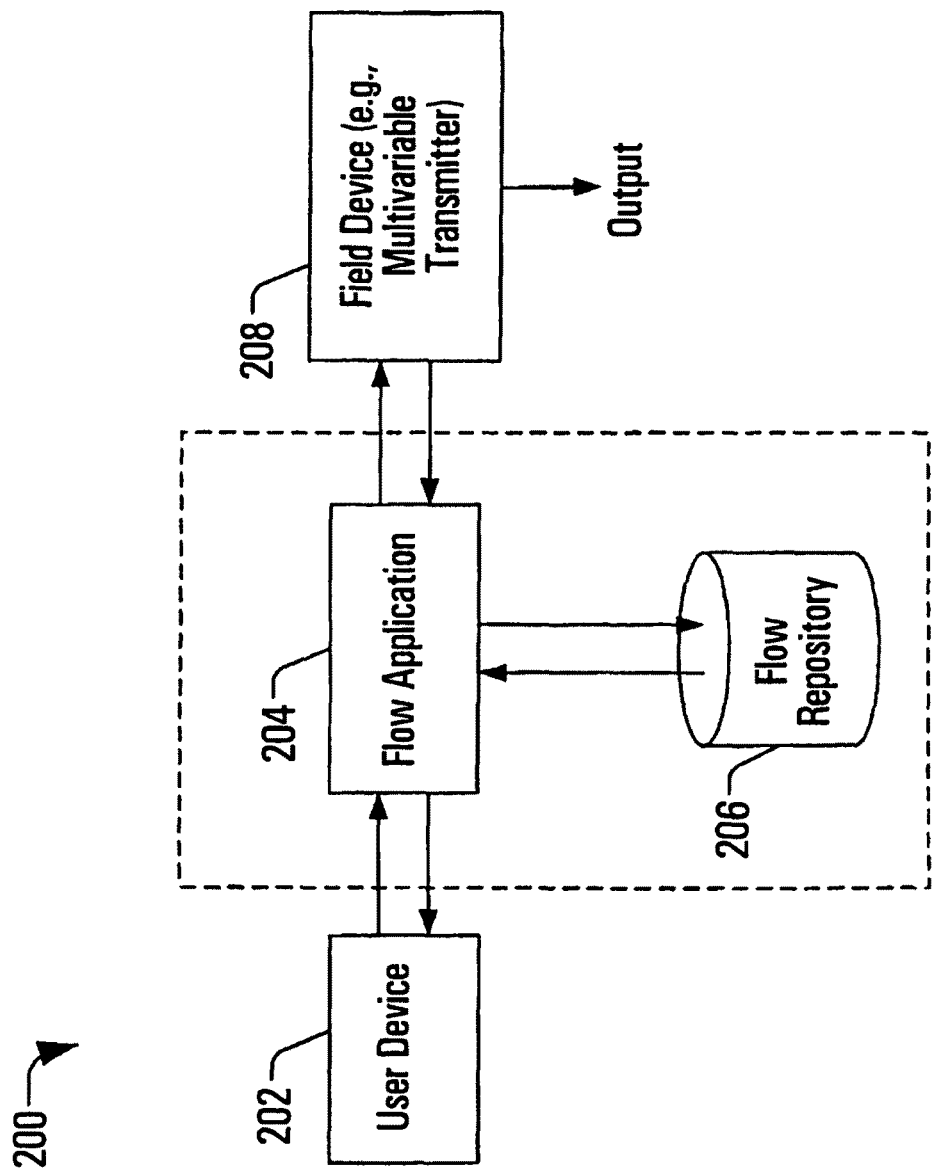
FIG. 2 is a block diagram of a particular illustrative embodiment of a system to configure a particular field device.

FIG. 2 is a block diagram of a particular embodiment of a system 200 to configure a field device 208, such as a multi-variable transmitter. The system 200 includes a user device 202 that can include a processor (processing logic) that is adapted to access a flow application 204. The flow application 204 is adapted to communicate with a flow repository 206 to retrieve data from a flow repository 206 and to assemble a graphical user interface (GUI) that is accessible to a user to configure the field device. In a particular embodiment, the flow repository 206 and the flow application 204 can be stored on the user device 202, store remotely, and/or stored in (or received from) multiple locations. In another particular embodiment, the flow application 204 can be stored on a device that is remote from the user device 202 and that is accessible via a network. In a particular example, the flow application 204 can be distributed across multiple servers. Further, the flow repository 206 and the flow application 204 can be stored on different devices or on the same device, depending on the implementation.

In a particular embodiment, the flow application 204 includes a graphical user interface generator, logic, and multiple equations. The flow application 204 is adapted to retrieve data, such as fluid information, primary element data with associated equation identifiers, other information, or any combination thereof from the flow repository 206. The flow application 204 uses the retrieved data to generate a graphical user interface including user selectable options, which GUI is provided to the user device 202 for configuring the flow application 204 for use with the field device 208. In a particular example, the flow application 204 produces a GUI that allows for user selection of a fluid and a primary element (such as orifice plates, or other fluid flow elements) with which the field device will operate, which selections include an equation identifier that is used by the flow application 204 to determine which equation to use and to provide user options that are specific to the selected primary element and the associated equation data. Thus, the configuration is specific to the selected device, reducing the possibility of configuration errors. Note that the flow application is typically not implemented in the field device. Instead, it is implemented in a device which is used to configure the field device. The flow application calculates or otherwise determines information, such as coefficients for flow equations, which are then transferred to, and stored in, the field device for use in measuring flow of process fluid.

Figure 3:
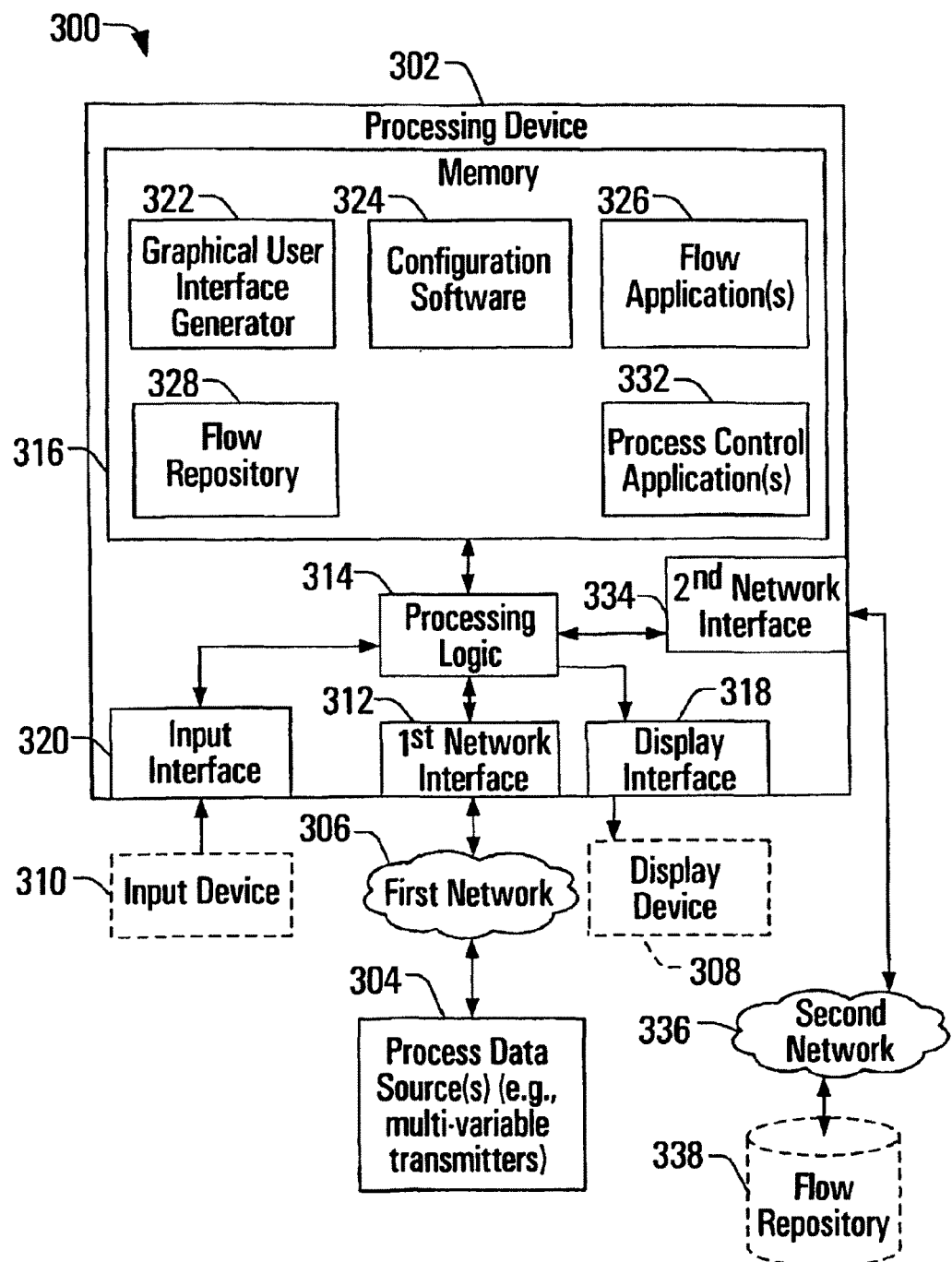
FIG. 3 is a block diagram of a second particular illustrative embodiment of a system to configure a particular field device.

FIG. 3 is a block diagram of a second particular illustrative embodiment of a system 300 to configure a reference equation associated with a field device. In a particular embodiment, the field device can be a multi-variable device or a single variable device that receives process variable data from other sources. The system 300 includes a processing device 302 that is adapted to communicate with one or more process data sources 304, such as a field device, via a first network 306. In a particular embodiment, the processing device 302 may provide display information to a display device 308 and is adapted to receive data from an input device 310. In a particular illustrative, non-limiting embodiment, the display device 308 and the input device 310 may be associated with a remote computing device, which may be adapted to communicate with the processing device 302 via a network, such as a second network 336. In a particular embodiment, the first network 306 can be a process control network (such as a two-wire process control network operated in accordance with the HART® protocol, a FieldBus protocol, a wireless protocol, etc.), and the second network 336 can be a transmission control protocol (TCP)/Internet Protocol (IP) network. In another particular embodiment, the first network 306 can be a Power over Ethernet-type network, and the second network 336 can be another Ethernet-type network. It should be understood that the processing device 302 can utilize any number of protocols for communicating with process data sources 304 (field devices) and other devices.

The processing device 302 includes a first network interface 312 that is adapted to communicate with the first network 306. The processing device 302 further includes processing logic 314 that is coupled to the first network interface 312 and that has access to a memory 316. In a particular embodiment, the processing logic 314 can be referred to as processing logic, which may be distributed across one or more devices. The processing logic 314 is coupled to a display interface 318 to provide display data to a display device 308. The processing logic 314 is also coupled to an input interface 320 that is adapted to receive data from an input device 310. Further, the processing logic 314 is coupled to a second network interface 334, which is adapted to communicate with a flow repository 338 via a second network 336. In a particular embodiment, the flow repository 338 may be stored at a separate server. In another particular embodiment, the flow repository 338 may be omitted and the flow repository may be stored within the memory 316 (as shown at 328). The flow repository 338 (or 328) includes a list of fluids/fluid types, an associated list of primary elements and associated fluid flow equation identifiers, other information, or any combination thereof.

The memory 316 includes a plurality of instructions which are executable by the processing logic 314 to provide a graphical user interface for configuring one or more field devices. The memory 316 includes a flow application 326 that is adapted to access a flow repository 328 (or 338) to retrieve data. The memory 316 further includes a graphical user interface generator 322 which is executable by the processing logic 314 to generate a graphical user interface (GUI) including data and options related to the retrieved data, which GUI can include different user selectable options based on a selected field device and based on particular user preferences. In a particular embodiment, the memory 316 also includes configuration software 324 that is executable by the processing logic 314 to configure graphical user interface preferences, such as user-based or role-based preferences that determine what options may be accessible to the particular operator. In a particular example, the graphical user interface preferences may specify which options can be configured by a particular user based on login information. Further, the graphical user interface preferences may specify particular customizations. Additionally, the configuration software 324 may be accessed by the processing logic 314 to configure options associated with the one or more process data sources 304, such as a field device.

In a particular embodiment, the flow application 326 is capable of configuring the process device based upon one or more equations, such as gas expansion factor equations, fluid flow equations, other equations, or any combination thereof. The equations may be contained within the application 326 and identified by information in the flow repository 328, or may be received from the fluid repository 328. The flow application 326 is adapted to use the GUI generator 322 to produce a GUI including multiple user-selectable options related to data retrieved from the flow repository 328 (and/or flow repository 338). The data retrieved from the flow repository 328 can include a list of fluid primary elements with related equation data, other information, or any combination thereof. The GUI includes selectable options related to the fluids, and a list of primary elements. Each element in the list may be associated with particular equation information, such that the user can select a particular entry from the list to specify which equation data should be used by the flow application 326. Further, such selection may influence which options are displayed to the user for configuring the field device. In a particular example, the flow repository 328 includes data related to multiple primary elements (such as a list of orifice plates, averaging Pitot tubes, other primary elements, or any combination thereof), which may be selected by a user to configure a particular field device.

In a particular example, the flow application 326 is compiled independently from the flow repository 328, allowing the flow repository 328 to be replaced or updated without requiring the flow application 326 to be re-compiled. Further, the flow repository 328 can be a structured data source, such as a table, that is not compiled. The flow repository 328 is adapted to be responsive to the flow applications 326 to provide data and configurable options related to primary elements, which may be used in connection with a particular field device.

FIGS. 4-8 are illustrative examples of a particular embodiment of a graphical user interface (GUI) that can be accessed by a user to configure one or more field devices. It should be understood that the GUI is for illustrative purposes only, and that the particular arrangement of elements within the GUI may vary, depending on the specific implementation.

Figure 4:
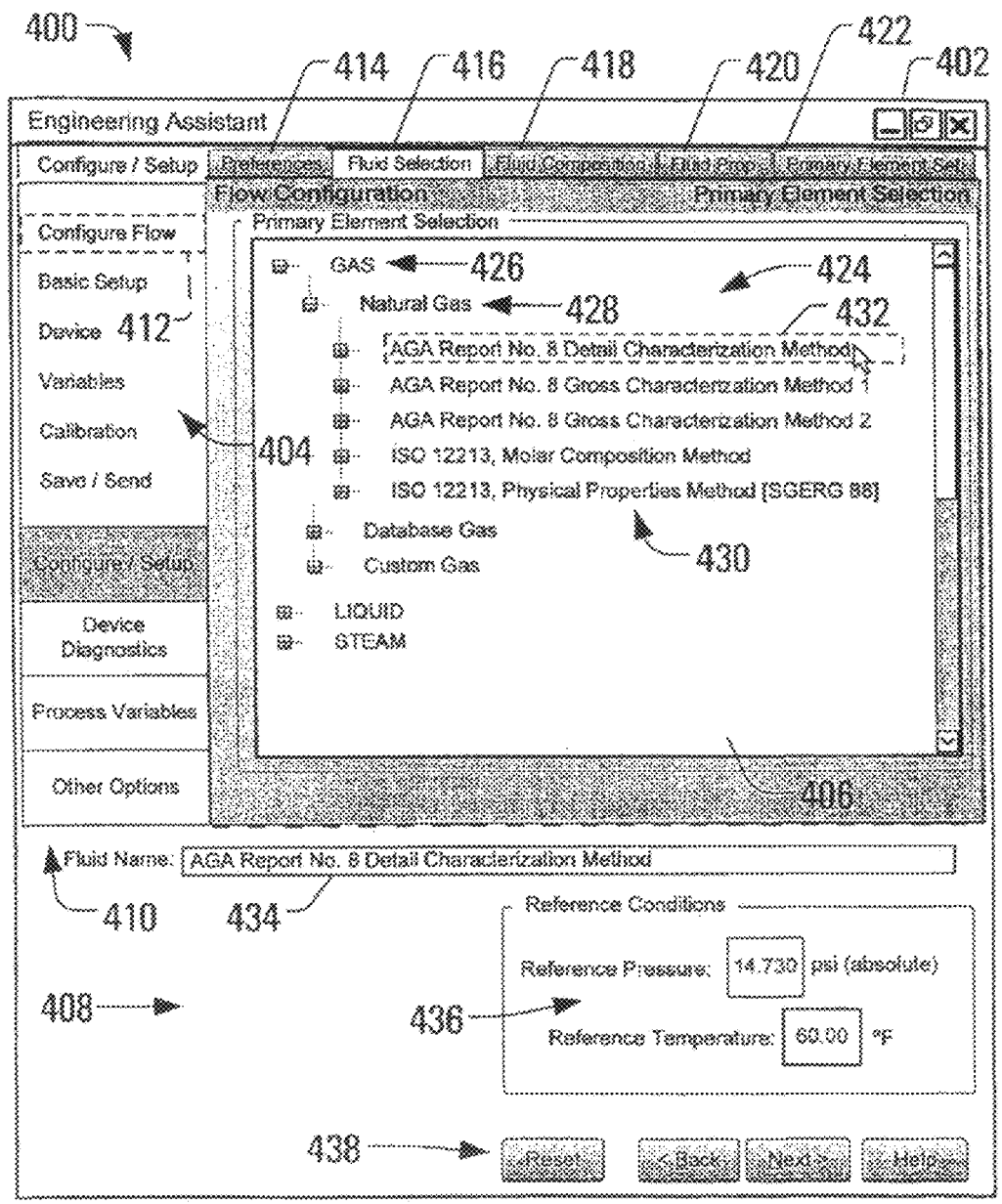
FIG. 4 is a diagram of a particular illustrative embodiment of a first graphical user interface (GUI) that is accessible by a user to configure a flow application for use in connection with a particular field device.

FIG. 4 is a diagram of a particular illustrative embodiment of a first GUI 400 that is accessible by a user to configure a particular field device. The GUI 400 includes a window 402 that includes a control pane 404, a selection pane 406, and an options pane 408. The control pane 404 can include various user-selectable options 410. In this particular example, the selectable options 410 include a "configure flow" option, a "basic setup" option, a "device" option, a "variables" option, a "calibration" option, and a "save/send" option. The "configure flow" option 412 is selected. The GUI 400 further includes selectable tabs, including a "preferences" tab 414, a "fluid selection" tab 416, a "fluid composition" tab 418, a "fluid properties" tab 420, and a "primary element selection" tab 422. The "fluid selection" tab 416 is selected.

Based on data retrieved from the flow repository, the selection pane 406 displays a list 424 of fluid categories 426, subcategories 428, and fluid selection options 430. In this instance, the fluid categories 426 include "GAS", "LIQUID", and "STEAM." The subcategories 428 for the category "GAS" include "AGA Report No. 8 Detail Characterization Method", "AGA Report No. 8 Detail Characterization Method 1", "AGA Report No. 8 Detail Characterization Method 2", "ISO 12213, Molar Composition Method", and "ISO 12213, Physical Properties Method (SGERG 88). The "AGA Report No. 8 Detail Characterization Method" is selected, as indicated at 432. The selection is reflected in the "fluid name" element 434 within the options pane 408. Based on the selected fluid selection option 432, a reference pressure and reference temperature associated with the selected option is displayed (at 436). In this instance, the "AGA Report No. 8 Detail Characterization Method" selection at 432 specifies a reference pressure of 14.730 psi (absolute) and a reference temperature of 60.00 degrees Fahrenheit. Further, the GUI 402 includes user-selectable buttons 438, including a "Reset" button, a "Back" button, a "Next" button, and a "Help" button.

In a particular embodiment, depending on which fluid category 426 is selected, the subcategories 428 within the category 426 may vary. Further, the categories 426, the subcategories 428, and the fluid selection options 430 are specified within a flow repository, which is accessed by the flow application to retrieve data, from which the GUI 400 is generated.

Figure 5:
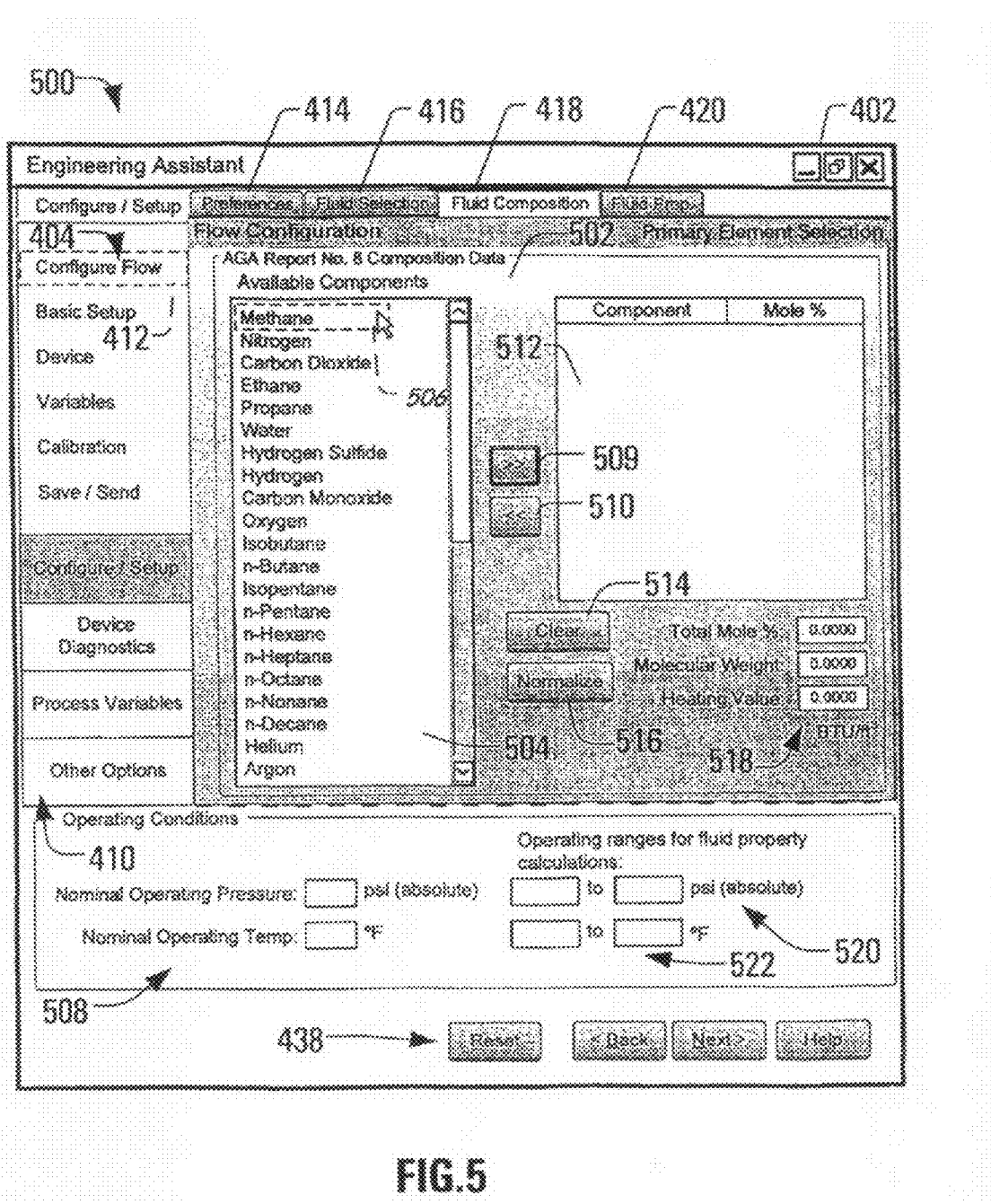
FIG. 5 is a diagram of a particular illustrative embodiment of a second GUI that is accessible by a user to configure a flow application for use in connection with a particular field device.

FIG. 5 is a diagram of a particular illustrative embodiment of a second graphical user interface (GUI) 500 that is accessible by a user to configure a flow application for use in connection with a particular field device. To the extent that elements are repeated, the same reference numerals are used so that the description of those elements does have to be repeated. In GUI 500, the "Fluid Composition" tab 418 is selected, revealing a fluid composition selection pane 502 and an "operating conditions" pane 508. The composition selection pane 502 displays a list of available components 504 related to composition data for the selected "AGA Report No. 8 Details Characterization Method" 432 illustrated in FIG. 4. In this particular instance, the list of available components 504 includes Methane, Nitrogen, Carbon Dioxide, Ethane, Propane, Water, Hydrogen Sulfide, Hydrogen, Carbon Monoxide, Oxygen, Isobutane, n-Butane, Isopentane, n-Pentane, n-Hexane, n-Heptane, n-Octane, n-Nonane, n-Decane, Helium, and Argon. It should be understood that other components may be included within the list depending on the specific selections made via the GUI of FIG. 4 and based on the particular implementation. In a particular embodiment, the list of components 504 is derived from data retrieved from the flow repository, and the contents of the list are determined from the flow repository. In this particular instance, "Methane" is selected, as indicated at 506.

The "Fluid Composition" selection pane 502 further includes an "Add" button 509 and a "Remove" button 510 to add selected components, such as Methane 506 to the selected components box 512. When an element, such as Methane is added to the selected components box 512 by clicking the "Add" button 509 and entering a mole percentage for Methane, the total mole percentage, molecular weight, and heating value in BTU/ft$^3$ are automatically populated at 518. The user can remove selections by clicking the "Clear" button 514 or normalize selections by clicking the "Normalize" button 516. In a particular example, when a component, such as Methane 506 is added to the selected components box 512, the name is moved into the selected components box 512 and a text input is made available for the user to specify a percentage molarity. Depending on the equations to be used, certain components may be required at a pre-defined mole percentage, and the GUI 500 may prevent improper mole percentage entries by generating an alert if such data is entered by the user.

The operating conditions pane 508 includes user-selectable (configurable) inputs, including a "nominal operating pressure" and associated operating pressure ranges for fluid property calculations 520 and "nominal operating temperature" and associated operating temperature ranges 522.

Figure 6:
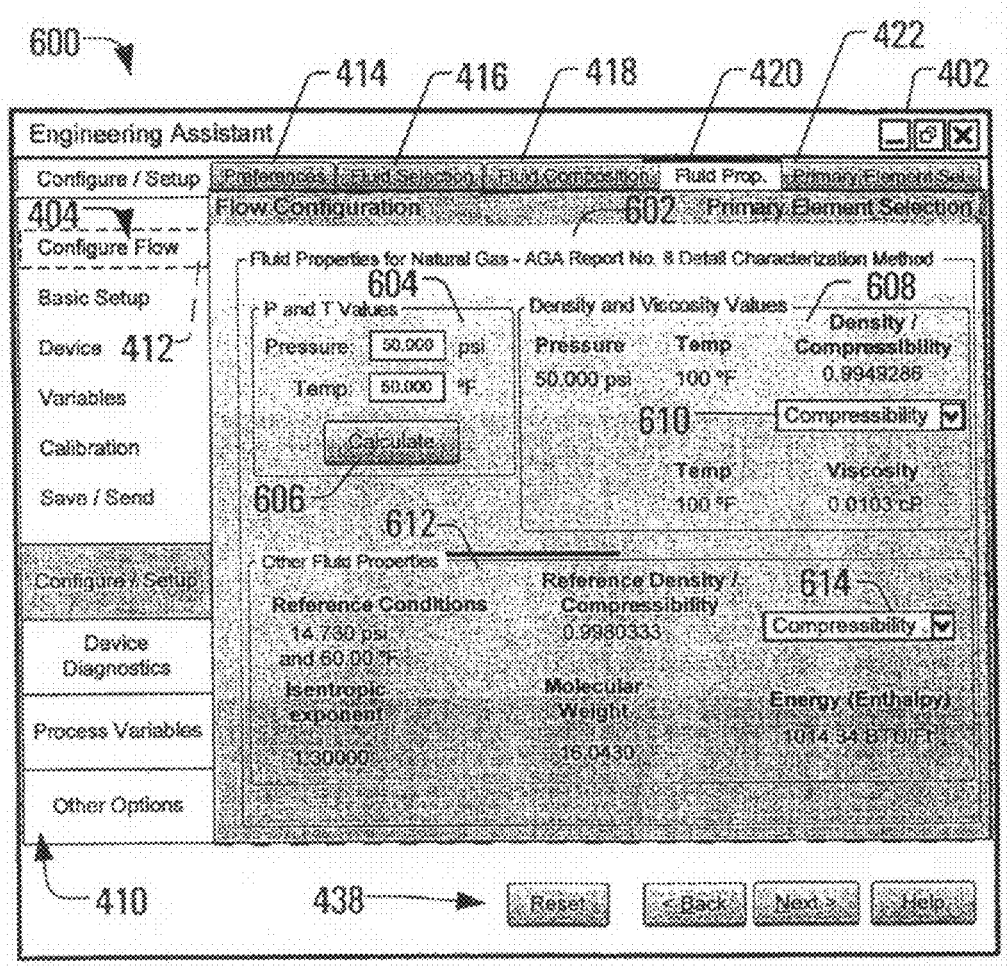
FIG. 6 is a diagram of a particular illustrative embodiment of a third GUI that is accessible by a user to configure a flow application for use in connection with a particular field device.

FIG. 6 is a diagram of a particular illustrative embodiment of a second graphical user interface (GUI) 600 that is accessible by a user to configure a flow application for use in connection with a particular field device. To the extent that elements are repeated, the same reference numerals are used so that the description of those elements does have to be repeated. In GUI 600, the "Fluid Properties" tab 420 is selected, revealing a fluid properties pane 602. The fluid properties selection pane 602 includes user-configurable options associated with fluid properties for natural gas for the AGA Report No. 8—Detail Characterization Method selected in FIG. 4. The "Fluid Properties" pane 602 includes pressure and temperature values 604, density and viscosity values 608, and other fluid properties 612. The pressure and temperature values 604 allow a user to enter pressure and temperature values and to click a "Calculate" button 606, which updates some of the values associated with the density and viscosity values 608, and the other fluid properties 612. Further, the density and viscosity values 608 and the other fluid properties 612 can include "Compressibility" pull-down menus 610 and 614, respectively, allowing a user to display compressibility factor or density values for the selected gas composition at the pressure and temperature indicated in 604.

In a particular embodiment, some of the values, such as viscosity, density, reference conditions, Isentropic exponents, reference density, molecular weight, and energy can be retrieved from the flow repository, hard coded within the flow application, or calculated. Further, the various data points can vary based on the selected composition.

Figure 7:
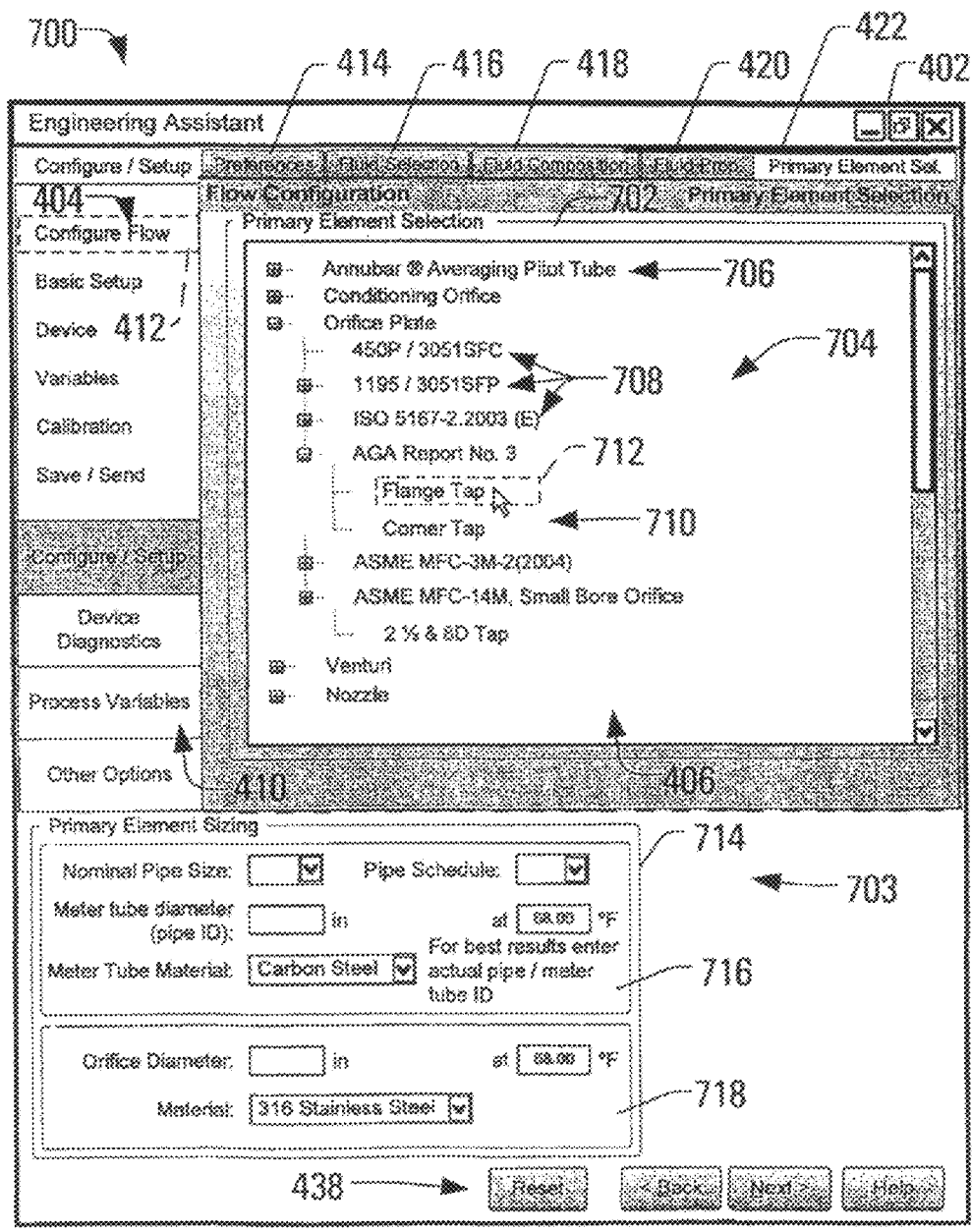
FIG. 7 is a diagram of a particular illustrative embodiment of a fourth GUI that is accessible by a user to configure a flow application for use in connection with a particular field device.

FIG. 7 is a diagram of a particular illustrative embodiment of a fourth GUI 700 that is accessible by a user to configure a flow application for use in connection with a particular field device. To the extent that elements are repeated, the same reference numerals are used so that the description of those elements does have to be repeated. In GUI 700, the "Primary Element Sel." tab 422 is selected, revealing a primary element selection pane 702 and a primary element sizing pane 703. The primary element pane 702 includes a hierarchical list of primary elements 704. At a top level 706, the hierarchical list of primary elements includes an Annubar® Averaging Pitot Tube option, a Conditioning Orifice option, and Orifice Plate option, a Venturi Tube option, and a Nozzle option. The available options can be retrieved from the flow repository, so that the options can vary by making changes to the flow repository. Each option at the top level 706 can be associated with one or more subcategories 708, which subcategories can include further sub-items 710. In this particular example, the Orifice Plate option is expanded, revealing subcategories 708, which include a "450/3051SFC" option, an "1195/3051SFP" option, an "ISO 5167-2.2003(E)" option, an "AGA Report No. 3" option, an "ASME MFC-3M-2(2004)" option, and an "ASME MFC-14M, Small Bore Orifice" option. It should be understood that the subcategories 708 and sub-items 710 are also defined within the flow repository. In this instance, the "AGA Report No. 3" option is expanded, revealing the sub-items 710, which include a "Flange Tap" item 712 (which is selected) and a "Corner Tap" item.

Selection of the "Flange Tap" item 712 causes the GUI 700 to display particular options for the primary element sizing pane 703, including primary element sizing options 714. The primary element sizing options 714 include pipe sizing options 716 and orifice information options 718. The pipe sizing options 716 include "Nominal Pipe Size", "Pipe Schedule", "Meter Tube Diameter", "Temperature", and "Meter Tube Material". The orifice information options 718 include an "Orifice diameter", "Temperature", and "Material". In a particular embodiment, the temperature setting may be pre-defined based on the selected primary element and its associated flow equation.

Figure 8:
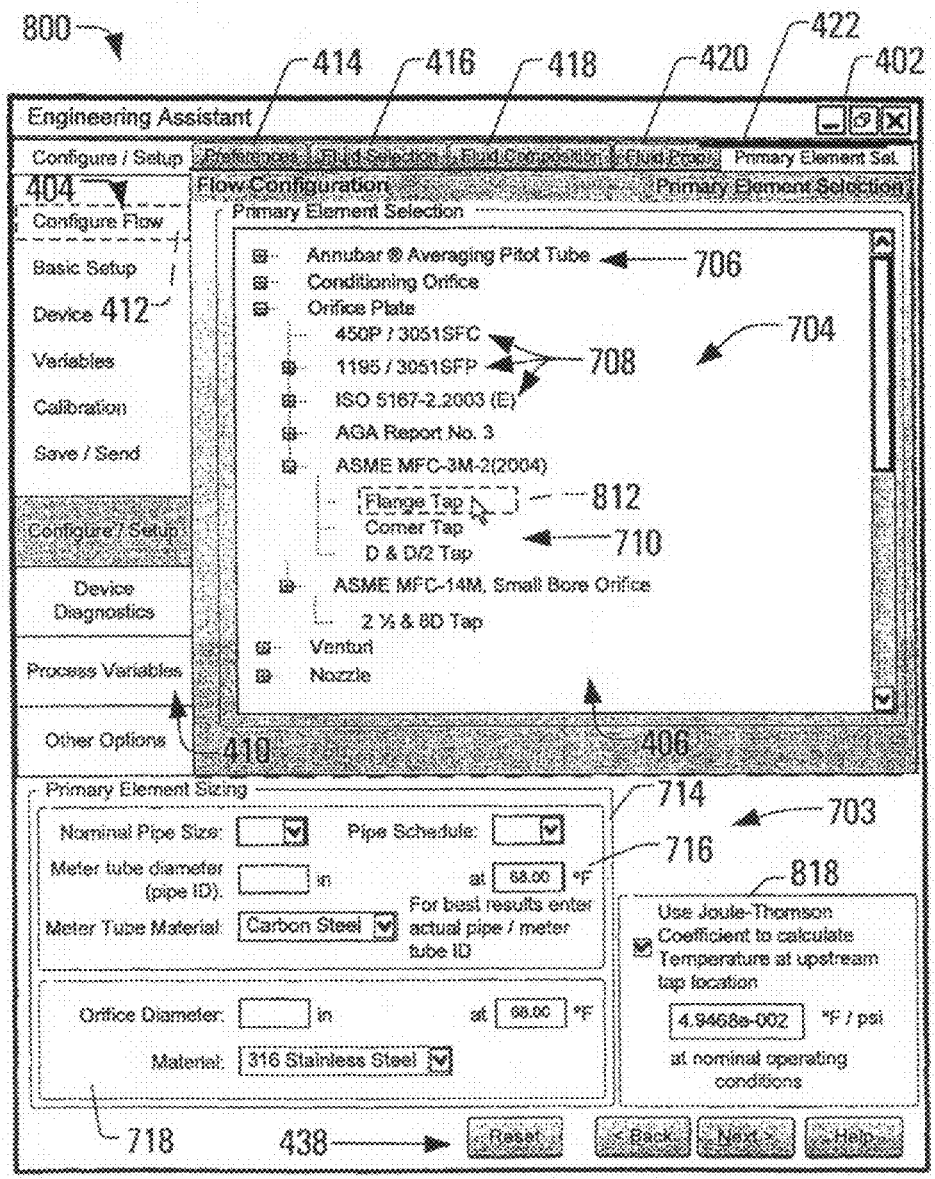
FIG. 8 is a diagram of a particular illustrative embodiment of a fifth GUI that is accessible by a user to configure a flow application for use in connection with a particular field device.

FIG. 8 is a diagram of a particular illustrative embodiment of a fifth GUI 800 that is accessible by a user to configure a flow application for use in connection with a particular field device. To the extent that elements are repeated, the same reference numerals are used so that the description of those elements does have to be repeated. In GUI 800, the "Primary Element Sel." tab 422 is again selected. In this instance, the "AGA Report No. 3" subcategory is collapsed, and the "ASME MFC-3M-2(2004)" subcategory is expanded, revealing three sub-items 810. The three sub-items 810 include a "Flange Tap" item 812 that is selected, a "Corner Tap" item, and a "D & D/2 Tap" item.

In this example, even though the "Flange Tap" item 812 is selected, similar to the "Flange Tap" item 712 illustrated in FIG. 7, the selection is within a different primary element category that is associated with the "ASME MFC-3M-2 (2004)" subcategory, which may be associated with different expansion calculations, for example. In this instance, an additional option 818 is displayed within the primary element sizing pane 703, which additional option 818 allows a user to use the Joule-Thomson coefficient to calculate a temperature at an upstream tap location. Since insertion of a temperature probe upstream from the tap can influence measurements at the tap, the Joule-Thomson coefficient provides a calculation for estimating the upstream temperature without impacting the fluid flow upstream from the tap. This additional option 818 is not available for the AGA Report No. 3 flange tap 712 (illustrated in FIG. 7).

In a particular embodiment, the flow application generates the GUIs 400 to 800 based on data retrieved from a flow repository. In a particular example, the particular options are derived from a list of fluids, types of fluids, compositional elements, and primary elements that are stored within the flow repository. Adjustments to the flow repository can be made to alter options available to the user within the flow application.

It should be understood that the GUIs 400, 500, 600, 700, and 800 illustrated in FIGS. 4-8 are for illustrative examples only, and are not intended to be limiting. It will be understood that different primary elements can have different fluid selections, and the particular field device may be susceptible to different types of environmental and operating conditions, which may alter the options available to the user. Further, it should be understood that a variety of equations may be used with any given primary element, and that the flow repository can include an equation identifier associated with each instance of a primary element, thereby providing the user with multiple possible selections for a given configuration.

Figure 9:
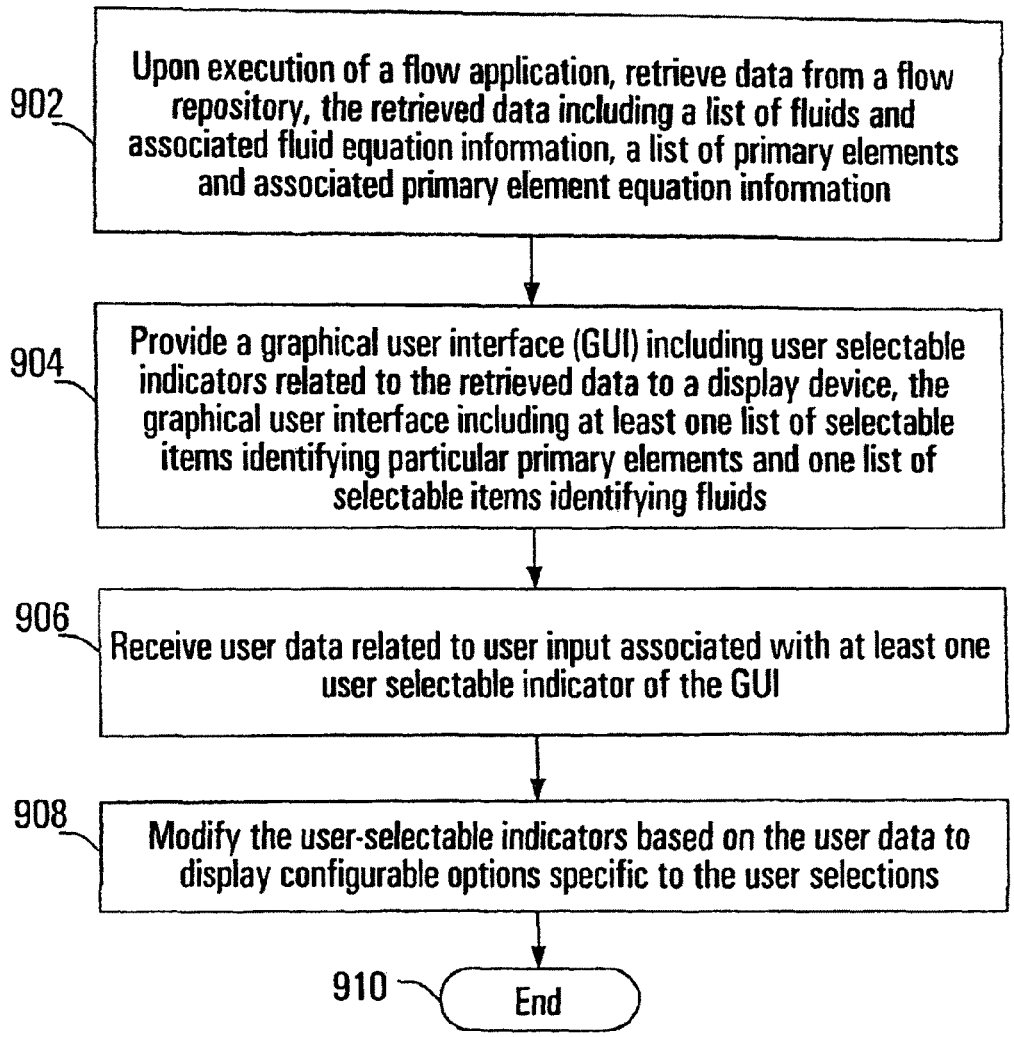
FIG. 9 is a flow diagram of a particular illustrative embodiment of a method of configuring a particular field device.

FIG. 9 is a flow diagram of a particular illustrative embodiment of a method of providing a generated graphical user interface (GUI) to a user to configure a particular field device. At 902, data is retrieved from a flow repository upon execution of a flow application, where the retrieved data includes a list of fluid types, associated lists of primary elements, and associated equation identifiers. In a particular embodiment, the fluids can be categorized such as gas, steam, and liquid. Further, the fluids can include subcategories such as natural gas, and other subcategories, as well as selectable items within the subcategories. In a particular example, particular gases may utilize particular equations of state according to industry standards.

Advancing to 904, a graphical user interface (GUI) is provided to a display device, which GUI includes user selectable indicators related to the retrieved data, where the GUI includes at least one list of selectable items that identify particular primary elements. In a particular embodiment, each of the primary elements identifies associated discharge coefficient, gas expansion factor or thermal expansion effects equation data for use in calculating terms related to the primary element. Continuing to 906, user data is received that is related to user input associated with at least one user selectable indicator of the GUI. In a particular example, the user data can include a selection of a particular gas, primary element, fluid, fluid composition, another indicator, associated parameter data, or any combination thereof.

Proceeding to 908, user-selectable indicators are modified based on the user data to display configurable options specific to the user selections. In a particular example, configurable options displayed within the GUI may vary based on user selections of other elements (as discussed above with respect to FIGS. 4-8). The method terminates at 910.

Figure 10:
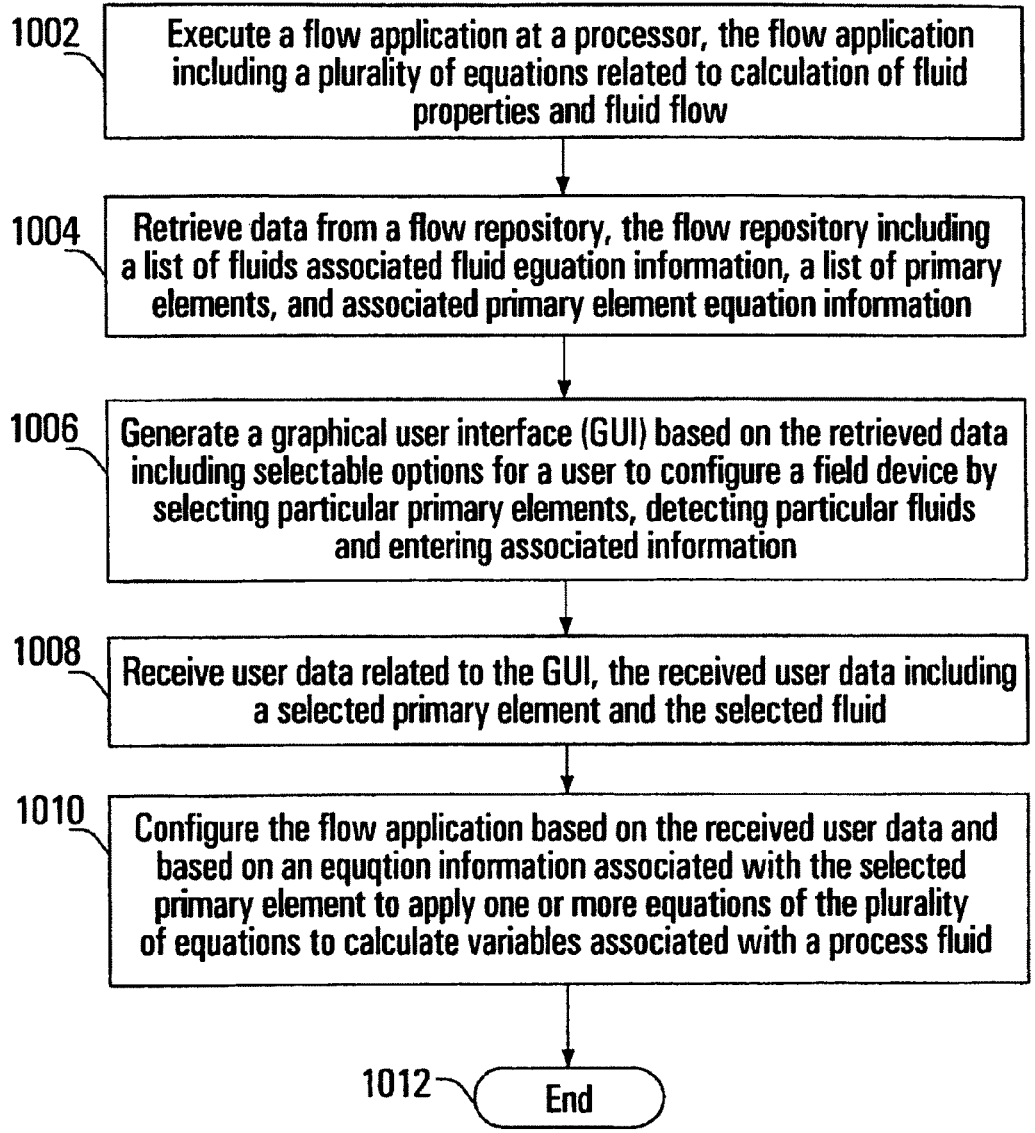
FIG. 10 is a flow diagram of another particular illustrative embodiment of a method of configuring a particular field device.

FIG. 10 is a flow diagram of another particular illustrative embodiment of a method of providing a generated graphical user interface (GUI) to a user to configure a particular field device. At 1002, a flow application is executed at a processor in a configuration device such as a PC, where the flow application operates on a plurality of equations related to calculation of fluid properties and fluid flow. Moving to 1004, data is retrieved from a flow repository, which includes a list of fluids, list of primary elements, and equation data. In a particular embodiment, the equation data can be used by the flow application to generate the equations used in calculating fluid properties for a particular configuration.

Continuing to 1006, a graphical user interface is generated based on the retrieved data including selectable options for a user to configure a field device by selecting particular elements and entering associated information. In a particular example, the GUI can include user-selectable indicators including a selectable list of fluids, fluid properties, primary elements, fluid composition elements, and other selectable items. The user-selectable indicators may include selectable tabs to reveal different configuration pages for accessing the various configurable elements. Proceeding to 1008, user data related to the GUI is received, which received user data includes a selected primary element. Advancing to 1010, the flow application is configured based on the received user data and based on the equation data associated with the selected fluid and primary element to calculate variables associated with a process fluid. In a particular example, selection of a particular instance of a primary element from the GUI may include election of a particular gas expansion equation, a particular discharge coefficient equation, another equation, or any combination thereof. The flow application can generate a set of coefficients for use with a polynomial equation in the process device which is used to determine flow of process fluid. The method terminates at 1012.

In conjunction with the systems and methods described above, a process flow application is disclosed that operates in connection with a flow repository, which stores data including a list of fluids, list of primary elements, equation data, other information, or any combination thereof. The process flow application retrieves data related to a particular primary element from the flow repository and generates a graphical user interface (GUI) that includes one or more user selectable indicators related to the data retrieved from the flow repository to allow a user to configure a particular field device. In a particular embodiment, user interaction with the GUI causes the GUI to display only those user options that are relevant to a particular fluid type, fluid, primary element, or any combination thereof.

In a particular embodiment, by separating the flow application from the flow repository, the flow application can be generalized to operate with multiple field devices and multiple implementations without adding complexity to the configuration process. In particular, the flow repository can include a list of fluids, list of primary elements, associated equation data, and other information to control the flow application to produce a GUI that includes user selectable options for a particular field device configuration, while omitting options for other types of devices. Further, the flow application can be updated for new primary elements, new or customized flow equations, and various other features by updating the flow repository and without recompiling the flow application. In a particular example, the flow application is a compiled executable application, and the flow repository may be a structured data file that is accessible to the flow application to configure a field device. Although various databases have been discussed herein, the present invention can be used with any database and is not limited to any particular format or configuration. Examples include SQL databases, XML databases, text or otherwise delimited databases, relational databases, etc. The particular data generated herein can be in accordance with any desired equation. For example, the simplified equations of set forth above as Equation 1 and Equation 2 may be used as desired. Once the data is generated by the flow application, it can be transmitted to the flow transmitter without using any particular data transmission technique. A GUI may be used as desired or other input technique including, for example, a command line interface, or other interface techniques.

Although the present invention has been described with reference to preferred embodiments, workers skilled in the art will recognize that changes may be made in form and detail without departing from the spirit and scope of the invention.

What is claimed is:

1. A system to configure a field device of the type used to calculate a flow of a process fluid, the system comprising:
    a flow repository comprising:
        a list of process fluids with which the field device can be used;
        fluid equation data which provides information related to fluid equations for calculating fluid parameters of the process fluid;
        a list of primary elements which are adapted to interact with the process fluid and used to determine flow of the process fluid
    and associated primary element equation data which provides information related to primary element equations for calculating primary element parameters; and
    a flow application adapted to retrieve data from the flow repository and to receive user data including user-selectable options related to the retrieved data, the user-selectable options including at least one option to select a particular primary element and a particular process fluid, the flow application responsive to the user data to configure the field device through an interface based upon a selected fluid and corresponding fluid equation data and a selected primary element and corresponding primary element equation data;
    wherein the flow application further comprises a graphical user interface (GUI) generator to generate a GUI including the user selectable options accessible by a user to configure the field device through the interface, the user selectable options related to the list of primary elements and list of the process fluids, from the flow repository.

2. The apparatus of claim 1 wherein the flow application calculates the fluid parameters and equations and the primary element parameters and equations which are used by the field device to calculate the process flow rate.

3. The apparatus of claim 1 wherein the field device calculates the flow of process fluid as a function of fluid parameters determined with the fluid equations and the primary element parameters determined with the primary element equations.

4. The apparatus of claim 1 wherein the flow repository is received from another location.

5. The apparatus of claim 1 wherein the flow repository is received over a network connection.

6. The apparatus of claim 1 wherein the field device communicates over a wireless connection.

7. The system of claim 6, including an output configured to communicate with the field device.

8. The apparatus of claim 1 wherein the flow repository comprises a database.

9. The apparatus of claim 1 wherein the flow repository comprises a plurality of databases.

10. The system of claim 1, wherein the flow repository is stored at a first device and wherein the flow application is stored at a second device.

11. The system of claim 1, wherein the user data is received through a graphical user interface.

12. A system comprising:
    an interface adapted to communicate with a field device;
    processing logic; and
    memory accessible to the processing logic, the memory to store a flow repository including a list of process fluids and fluid equation data, a list of primary elements which are adapted to interact with a process fluid and used to determine flow of the process fluid and associated primary element equation data, the memory further including a flow application executable by the processing logic to:
        retrieve data from the flow repository upon execution;
        receive a user input including user-selectable indicators related to the retrieved data including selectable options related to the list of process fluids and the lists of primary elements;
        provide the user input to a destination device to select a primary element from the list of fluids and the lists of primary elements and to configure the field device through interface based upon the selected primary element and selected process fluid; and
        provide a GUI adapted to display configuration options specific to a selectable primary element and process fluid from the list of primary elements and the list of process fluids, and wherein the flow application is adapted to determine at least one equation related to the selected primary element and process fluid.

13. The system of claim 12, wherein the user-selectable indicators include at least one of a menu option, a text box, a check box, a radio button, a form button, an expandable tree, and combination boxes.

14. The system of claim 12, further comprising one or more network interfaces, and wherein the memory and the processing logic are distributed across one or more computing devices accessible via the one or more network interfaces and communicatively coupled via a network.

15. The system of claim 12, wherein the processing logic is adapted to receive data related to a selected primary element and selected process fluid.

16. The system of claim 12, wherein memory further includes instructions executable by the processor to test a validity of a user input and to generate an alert when the user input is outside of an acceptable range.

17. The system of claim 12, wherein the flow repository is updatable without recompiling the flow application, and wherein the updated flow repository alters user selectable options within the flow application.

\* \* \* \* \*